United States Patent
Guerra

(10) Patent No.: US 8,950,212 B2
(45) Date of Patent: Feb. 10, 2015

(54) ABSORPTION HEAT PUMP FOR OVERFEED GENERATOR OPERATING CONDITIONS

(76) Inventor: Marco Guerra, Bergamo (IT)

(*) Notice: Subject to any disclaimer, the term of this patent is extended or adjusted under 35 U.S.C. 154(b) by 380 days.

(21) Appl. No.: 13/050,694

(22) Filed: Mar. 17, 2011

(65) Prior Publication Data
US 2011/0225996 A1 Sep. 22, 2011

(30) Foreign Application Priority Data

Mar. 22, 2010 (IT) .............................. MI2010A0459

(51) Int. Cl.
F25B 15/06 (2006.01)
F25B 33/00 (2006.01)
F25B 15/02 (2006.01)
F25B 15/04 (2006.01)
F25B 30/04 (2006.01)

(52) U.S. Cl.
CPC ................ F25B 15/04 (2013.01); Y02B 30/62 (2013.01); F25B 2315/002 (2013.01); F25B 30/04 (2013.01)
USPC ................ 62/476; 62/101; 62/102; 62/238.7; 62/238.3

(58) Field of Classification Search
CPC ........ F25B 15/02; F25B 15/06; F25B 15/008; F25B 33/00; Y02B 30/62
USPC ....................... 62/101, 102, 238.7, 238.3, 476
See application file for complete search history.

(56) References Cited

U.S. PATENT DOCUMENTS

| 4,337,625 | A | * | 7/1982 | Wilkinson | 62/79 |
| 4,394,959 | A | * | 7/1983 | de Vries | 237/2 B |
| 5,490,393 | A | * | 2/1996 | Fuesting et al. | 62/101 |
| 5,799,502 | A | * | 9/1998 | Nomura et al. | 62/476 |
| 5,865,039 | A | | 2/1999 | Muller et al. | |
| 5,966,948 | A | | 10/1999 | Anand | |
| 6,598,415 | B2 | * | 7/2003 | Ichikawa et al. | 62/324.2 |
| 6,718,781 | B2 | | 4/2004 | Freund et al. | |
| 6,748,752 | B2 | | 6/2004 | Sarkisian et al. | |
| 2002/0108390 | A1 | * | 8/2002 | Ichikawa et al. | 62/324.2 |
| 2004/0144121 | A1 | | 7/2004 | Sarkisian et al. | |
| 2010/0275622 | A1 | * | 11/2010 | Guerra | 62/101 |
| 2010/0275623 | A1 | * | 11/2010 | Guerra | 62/101 |

FOREIGN PATENT DOCUMENTS

| EP | 0 001 858 A1 | 5/1979 |
| EP | 0 757 215 A3 | 2/1997 |
| EP | 1 233 240 A3 | 8/2002 |
| JP | 7-280382 A | 10/1995 |
| JP | 8-159591 A | 6/1996 |
| JP | 8-271080 A | 10/1996 |

OTHER PUBLICATIONS

Office Action of Nov. 26, 2012 from U.S. Appl. No. 12/768,525 to Guerra filed Apr. 27, 2010.

* cited by examiner

Primary Examiner — Frantz Jules
Assistant Examiner — Meraj A Shaikh
(74) Attorney, Agent, or Firm — Novak Druce Connolly Bove + Quigg LLP

(57) ABSTRACT

An absorption heat pump with a system for improving its efficiency under generator overfeed conditions. The absorber is bypassed to direct the rich solution directly into the generator, mixing this rich solution with liquid refrigerant.

16 Claims, 3 Drawing Sheets

ABSORPTION HEAT PUMP FOR OVERFEED GENERATOR OPERATING CONDITIONS

CROSS-REFERENCE TO RELATED APPLICATION

This application claims priority from Italian patent application no. MI2010A000459 filed Mar. 22, 2010.

FIELD OF THE INVENTION

The present invention relates to a heat pump for overfeed generator operating conditions.

BACKGROUND OF THE INVENTION

In heating systems for residential and commercial buildings, the thermal power requirement is typically a function of the external environmental temperature. The thermal load of the building becomes greater as the external temperature falls.

The power of the heating appliances for a given building is chosen for a design temperature (defined by regulations for every given place) which is normally close to the minimum mean temperature recorded over a long span of years. In north Italy this is often between −10° C. and −5° C., whereas in central Europe it is often at −20° C.

The temperature of the hot water of hydronic systems (common in the whole of Europe and north-east USA) is a function of the external temperature, according to a selectable "climatic curve" which enables better regulation of the power delivered by heating systems, and hence better comfort and less utilities consumption. This curve provides higher hot water plant delivery temperatures for lower external temperatures. A typical example is 70° C. delivery at −20° C., with 100% system power, 40° C. at +7° C. external temperature, with 35% system power. The operating conditions at low temperature do not have a determining impact on the system energy efficiency profile, because in the whole of Europe they affect only a small fraction of the total energy consumed for heating (which is delivered at mean ambient temperatures between 0° C. and 2° C.); in contrast, they have a determined impact in determining the maximum power and the temperature of the system water to be supplied.

In the current search for reducing the environmental impact of such activities, and in particular of heating (and domestic hot water), which in Europe is mainly responsible (equally with the transport sector-source CE/Ecoboiler study) for $CO_2$ emissions, the European Commission has composed a scale of the most efficient heating systems currently existing. The first place is occupied by heat pumps. It is evident that heat pumps, both electrical and absorption (GAHP), are receiving considerable interest. However, the application of heat pumps for heating purposes encounters certain obstacles which slow down their distribution. In particular, the profile of delivered power and temperatures obtainable does not follow that typically required by buildings. For example, heat pumps have efficiencies even double those of a boiler at temperatures of 7° C. and 40° C. for 100% of available power, but difficultly reach a delivery of 70° C. (currently only absorption heat pumps reach this figure), and often with powers equal to 30% for electric pumps and 60% for absorption pumps. Hence if sized to operate at the point of major energy interest, i.e. for an ambient temperature of about 2° C., heat pumps deliver a power and water system temperatures which are too low at design conditions.

In the known art this situation compels the following applicational solutions:

A first solution consists of over-dimensioning the heat pump to be installed. In addition to the greater cost, the system is considerably oversized under typical conditions, with working conditions which are penalizing because of the operation at very low partial loads (such heat pumps sometimes work for several hours at loads of 15%).

A second solution consists of adding a back-up system, typically an additional boiler or a set of electrical resistance elements (many kW of power required). All this makes the application of the heat pump even more costly, but above all more complicated to control (electronic integration system between the systems, and maintenance).

Moreover the temperature of the hydronic system water required in older homes (90% of all homes) is often >70° C., and up to 80° C. under very cold external ambient conditions. In such conditions none of the current heat pumps is able to satisfy these requirements.

To confront the aforestated problems, absorption heat pumps have been constructed composed not only of the thermodynamic circuit but also of a combustion system and a heat exchanger (generator) to which the combustion system provides the combusted power. In present-day absorption heat pumps, this combustion system is modulating and similar to that used on common boilers. An absorption heat pump requiring for example 12 kW of rated power can be served by a combustion system delivering from 20 to 3.5 kW.

It can therefore be considered that if greater power and delivered water temperatures are required (such as during low outside temperature), it would be sufficient to increase the input to the generator. In reality, under these conditions the effect of the increase in thermal input is a continuous increase in generator temperatures until one or other safety member intervenes.

U.S. Pat. No. 4,364,240 (expired) FIG. 3 shows how to increment the output delivered by a heat pump under conditions in which the evaporator no longer manages to recover heat from the low temperature source (e.g. low external temperature conditions). For this purpose a bypass for the rich solution is inserted, to feed this directly into the generator by bypassing the recovery heat exchangers within the cycle.

The bypass for the rich solution does not by itself enable the generator input to be increased sufficiently to force the delivery water temperature to the required levels under very low external temperature conditions. EP1233240-A2 and EP0001858-A1 describe absorption heat pumps pertaining to the known art.

SUMMARY OF THE INVENTION

An object of the present invention is to provide a heat pump which, when under extreme operation conditions, both enables high delivery temperatures to be provided, and enables the maximum rated thermal power to be delivered.

These and other objects are attained by providing a heat pump in accordance with the technical teachings of the accompanying claims. Advantageously the invention proposes to enable a significant increase in the typical input under rated conditions, of up to about +80% for maximum delivery temperatures to the hydronic system (temperature provided to the system) up to 80° C., all without over-dimensioning members such as the solution pump or internal heat exchangers.

The new invention hence enables operation under extreme conditions while simultaneously increasing the output of a heat pump by increasing the power provided to the generator.

BRIEF DESCRIPTION OF THE DRAWINGS

Further characteristics and advantages of the invention will be apparent from the description of a preferred but non-exclusive embodiment of the heat pump, illustrated by way of non-limiting example in the accompanying drawings, in which.

DETAILED DESCRIPTION OF THE PREFERRED EMBODIMENTS

Figure 1:
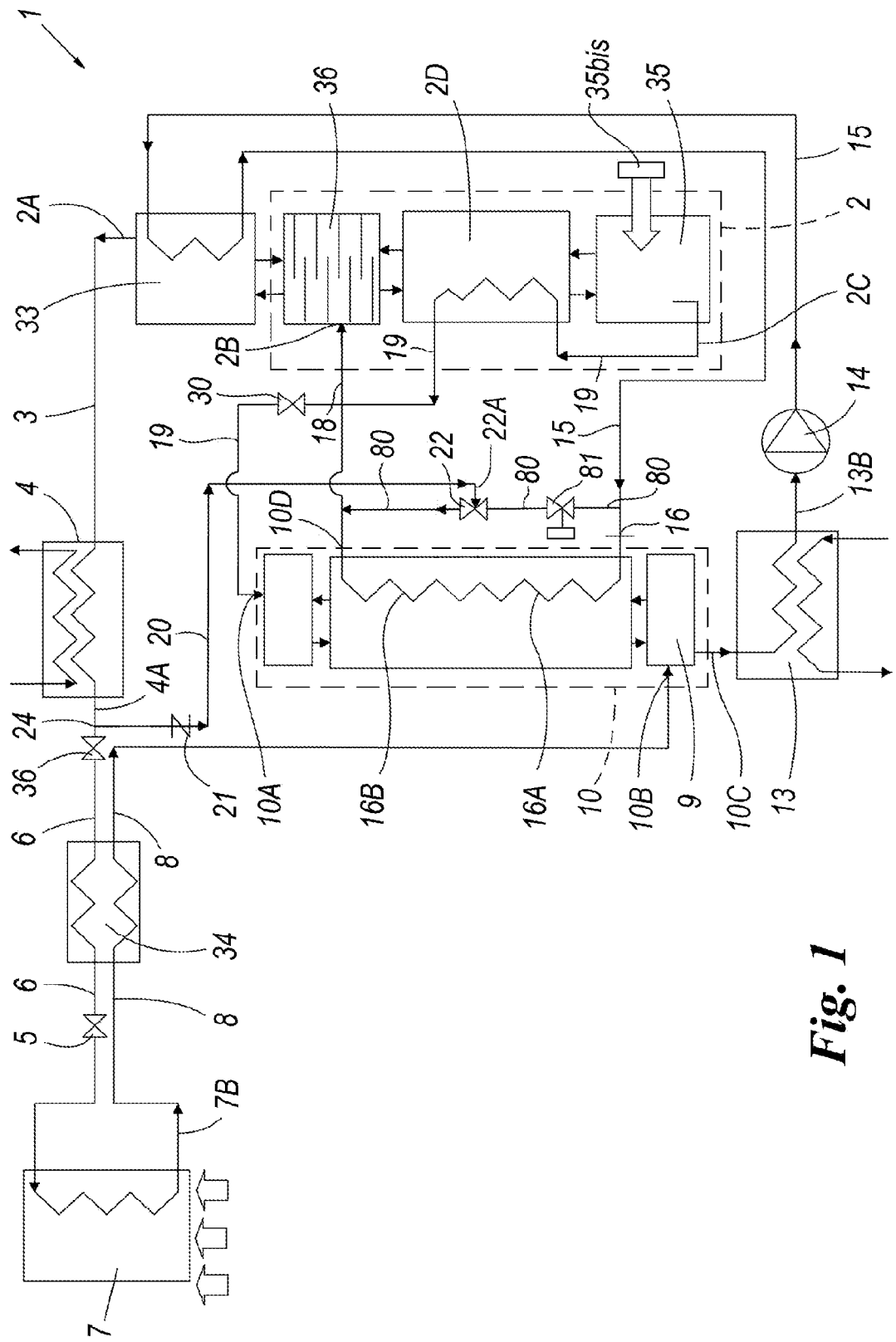
FIG. 1 shows a simplified scheme of the heat pump of the present invention.

With reference to said figures, these show a heat pump indicated overall by the reference numeral 1.

The heat pump illustrated in FIG. 1 operates with a cycle using as refrigerant a first fluid (in this specific case ammonia), which is absorbed in a second fluid (in this case water). The absorption heat pump comprises a conventional generator 2 or desorber which receives heat from a gas burner 35b on a typically finned portion 35 known as the boiler, which feeds a conventional plate column 36. The plate column 36 is connected to a rectifier 33, described hereinafter. The vapour outlet of the generator is connected via a rectifier and a first line 3 to a condenser 4 of conventional type, positioned in heat exchange contact with a transmission fluid which feeds the heating plant. This fluid is typically water fed into the plant by a pump, not shown.

A countercurrent heat exchanger 34 is provided downstream of the condenser 4 in a second line 6 connecting the condenser to an evaporator 7 via a throttle valve 5, to exchange heat with the vapour circulating through a third line 8 connecting the evaporator 7 (which can have as its heat source external air, or water from a low enthalpy geothermal source, stratum water, or another source) to an inlet 10B of an absorber 10. A further throttle valve 36 is provided upstream of the heat exchanger 34.

As already stated, an evaporator outlet 7B is connected by a third line 8 to an inlet 10B for vapour from said first fluid into the absorber 10, and specifically into a mixing zone 9.

The absorber 10 comprises a rich solution outlet 10C (ammonia absorbed in water) connected to a heat exchanger 13 in heat exchange contact with the transmission fluid of the heating plant.

An outlet 13B of the heat exchanger is connected to the suction side of a conventional pump 14, the delivery side of which is connected via a fourth line 15 to an inlet 16 of a circuit 16A, 16B in heat exchange contact with the absorber 10.

The fourth line 15 is in heat transmission contact with the rectifier 33 from which the rich ammonia solution subtracts heat to facilitate condensation of water vapour.

The circuit 16A, 16B subtracts heat from the absorber to hence transfer it to the rich solution originating from the pump 14 before being fed into the generator 2. This circuit is divided into two parts merely for reasons of description. In this respect, in the first part of the circuit 16A the rich solution rises in temperature, while in the second part 16B the ammonia present in the solution begins to evaporate (at the pressure present in the circuit 16A, B) to essentially anticipate the work done by the generator 2. That part of the absorber involved with the circuit part 16B is commonly known as a generator/absorber heat exchange (GAX) cycle.

A fifth line 18 extending from the heat exchanger 10 connects an outlet of the circuit 16A, 16B to an ammonia enriched (plus ammonia vapour) solution inlet 2B of the generator 2.

At the generator base, in proximity to the boiler 35, an outlet 2C is provided from which a poor ammonia solution is directed, via a sixth line 19 provided with at least one throttle valve 30, to a poor solution inlet 10A provided in the absorber 10, after yielding heat to the fluids present in the generator in a central portion 2D thereof.

The fourth line 15 comprises a bypass line 80 in which shutoff means for the rich solution (solenoid valve 81) are provided; the fourth line opens into the fifth line 18 downstream of the absorber 10. In this manner a part of the rich solution is conveyed directly to the generator rich solution inlet. The first line 3 is connected to a withdrawal line 20, which opens into the bypass line at an introduction (or mixing) point 22 indicated by the reference numeral 22A.

In this embodiment the withdrawal line 20 which extends from a withdrawal point 24 leads advantageously into the venturi 22A represented in the figure. It is positioned in the bypass line 80 downstream of the solenoid valve 81. However, it can also be positioned upstream of the valve 81, again in the bypass line.

The present invention makes it possible to increase the inlet power to the generator (burner 35 which can be increased up to 80% of the rated power) combined with a system for maintaining "colder" the top part of the desorber plate column as the rectifier load decreases when high temperatures are required at the heat exchangers 4 and 13. To achieve this, the rich solution heat exchange which takes place in the absorber 10 is eliminated and the flow and/or the $NH_3$ concentration of the rich solution entering the generator 2 are increased.

This can be achieved by bleeding-off part of the refrigerant leaving the condenser 4, and preferably mixing it into the rich solution line 18 entering the generator 36 by the entrainment effect of a liquid-liquid venturi or injector, so bypassing its heat exchange with the absorber.

Essentially, opening the solenoid valve 81 opens a simultaneous bypass for the rich solution pumped towards the generator and for a portion of the liquid refrigerant leaving the condenser, to reinsert them directly into the generator, above the exchanger portion 2D.

On opening the solenoid valve the thermal input of the generator (typically the combustion products of a burner 35 with power modulation) is increased to a maximum of +80% of the maximum power at rated conditions. The range of conditions within which this opening can take place is programmed within the controller firmware.

When the solenoid valve 81 is closed, the refrigerant bypass is inactive as the liquid-liquid injector or venturi 22A is not traversed by the drive fluid, and flow in the reverse direction is prevented by the non-return valve 21. This is valid whether feed through the bypass line takes place either upstream or downstream of the solenoid valve.

It should be noted that the refrigerant bypass alone cannot bypass the regenerative recuperators as the refrigerant is drawn by the solution pumped into the injector. Again, the rich solution bypass alone does not enable the generator input to be increased up to +80% and the water delivery temperature to >70° C. By introducing refrigerant through the withdrawal line, up to 10° C. is gained on the maximum system water delivery temperature compared with the arrangement with only the solution bypass (withdrawal line 20 absent).

In addition it should be noted that on opening the bypass of the present invention, the heat pump continues to operate as such (it withdraws heat from a cold source, the evaporator 7, and transfers it via heat exchangers 4 and 13 at a temperature higher than the withdrawal temperature), to the extend possible by the operating conditions; i.e. the heat pump is not changed into a boiler, such as in U.S. Pat. No. 4,718,243.

In the aforedescribed case, as a practical example the power increase at the burner 35 can reach 80% of the input at rated conditions, for example at A7W50 (i.e. at 7° C. external air and 50° C. hot water delivery temperature). In this case, if the heat provided by the burner is Qgen=10 kW (where the heat provided to the system is Quseful=17 kW by the effect of the heat pump efficiency) then the maximum input at A-7W75 (air at −7 and water at +75° C.) can be Qgen=18 kW under bypass open conditions, (where again Quseful=17 kW because of the reduction in the heat pump efficiency).

It should be noted that according to the present invention it is not necessary to add other surfaces or heat recuperators to the absorber in order to operate in the manner of extra thermal input at the generator. In this respect although the heat exchanger 13 has to exchange under bypass open conditions a heat quantity which is up to 80% greater, it operates under much higher DeltaT conditions because the solution leaves the heat exchanger 10 at a temperature about 30-45° C. higher as this heat exchanger is not cooled by the rich solution pumped to the generator, which bypasses it. The greater DeltaT enables the absorber 13, for equal surface area, to exchange all the additional heat received under bypass open condition.

Moreover, in contrast to U.S. Pat. No. 4,364,240 (for example FIG. 1 and FIG. 2) in which the poor solution leaves directly from the generator at the maximum temperature of the entire circuit and requires partial precooling of the heating system water (mixer valves or bypass on water side), in the present invention this is not required. The poor solution leaving the generator via the line 19 passes from the internal heat exchanger at 2D and leaves from the generator at temperatures typically from 40 to 70° C. lower than those reached in the boiler 35.

Figure 1A:
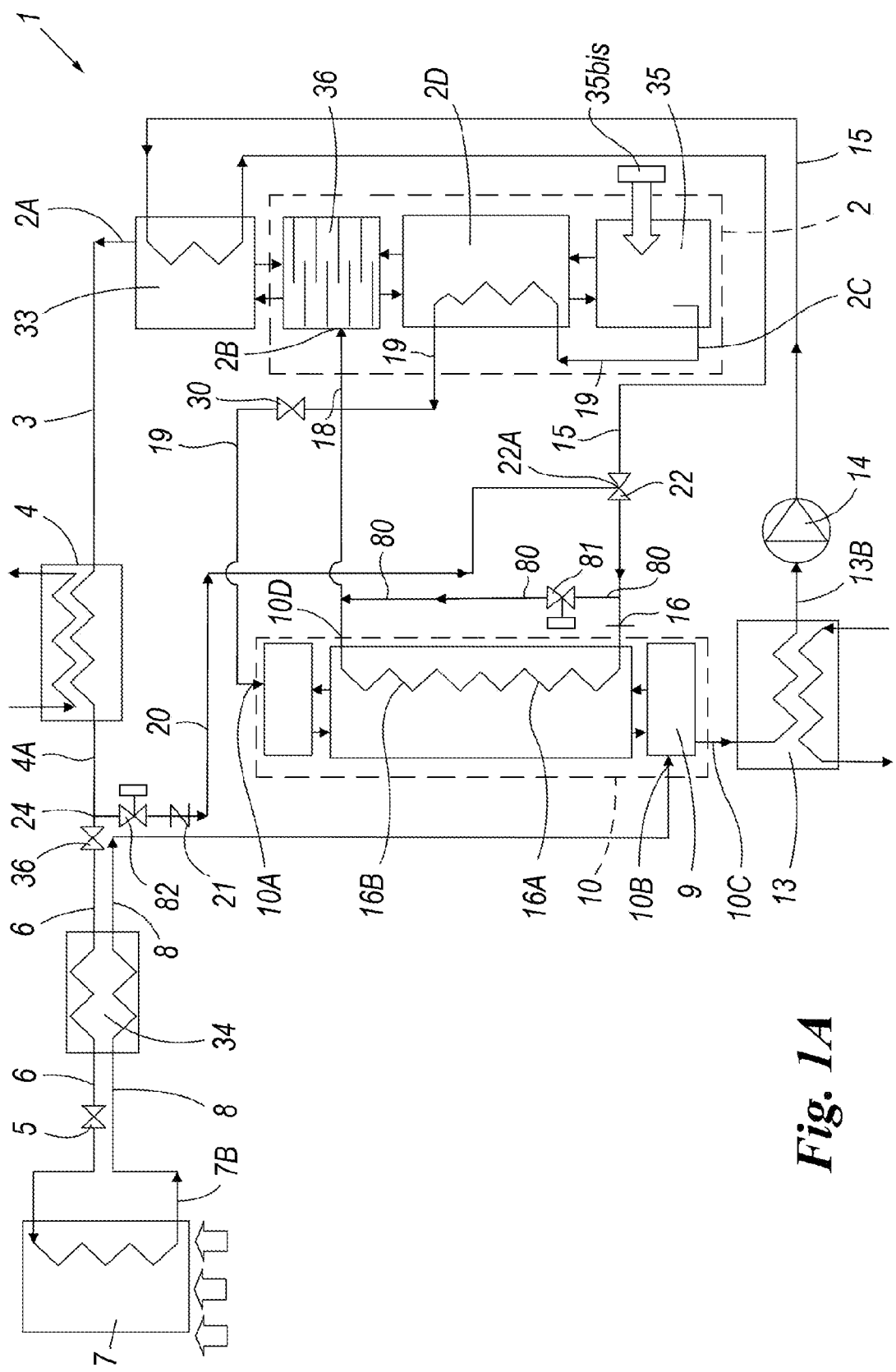
FIGS. 1A and 2 show two different embodiments of the present invention.

FIG. 1A shows an alternative embodiment in which the venturi 22A (and hence the introduction point 22) is positioned in the fourth line 15 upstream of the bypass line. As in the preceding embodiment, the liquid refrigerant is hence introduced into the rich solution upstream of the valve 81. In this case the withdrawal line 20 must comprise its own solenoid valve 82, which is operated simultaneously with the solenoid valve 81 in the bypass line, hence enabling the two lines 20, 80 to be excluded or activated.

In a still further embodiment, the introduction point 22 can be provided in the fifth line 18, downstream of the bypass line. Again in this case the solenoid valve 82 has to be provided in the line 20.

Figure 2:
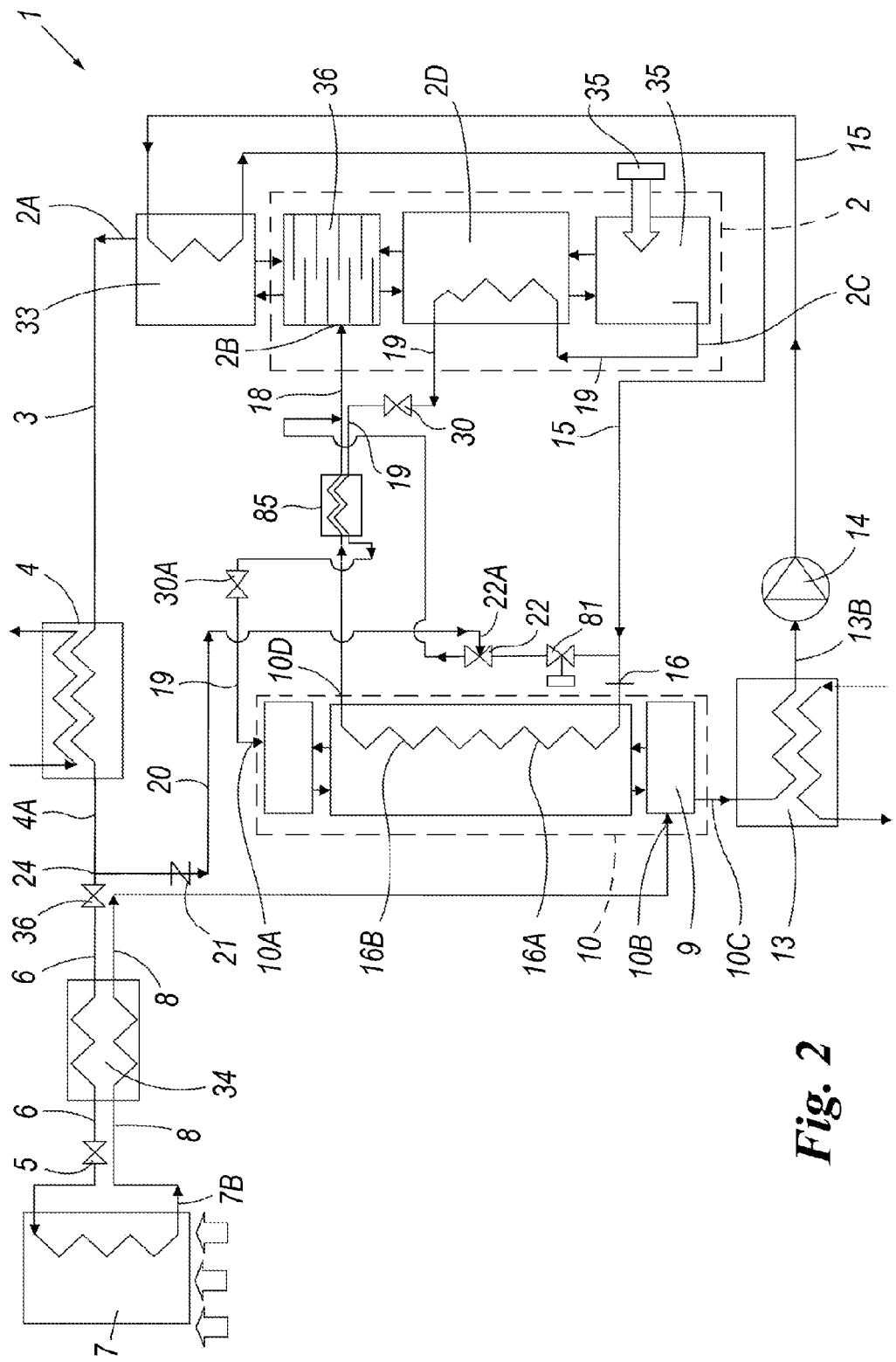

FIG. 2 shows an alternative embodiment of the heat pump 1 of FIG. 1. In this, similar parts are indicated by the same reference numerals and will not be further described.

The essential modification of this embodiment is the provision of heat exchange between the fifth line 18 and sixth line 19. The heat exchange is achieved by a preferably countercurrent but otherwise conventional heat exchanger 85. Advantageously, upstream of the heat exchanger 85, in the poor solution sixth line 19 there are provided a throttle valve 30 and, downstream of 85, a valve 30A able to lower the poor solution pressure at the heat exchanger 85 to an intermediate value between the pressure of the generator 2 and that of the evaporator 7.

This solution advantageously enables the heat pump efficiency to be improved when operating with reduced thermal input (modulation) as it reduces the flash losses in the poor solution.

Various embodiments of the invention have been described, however others can be conceived using the same inventive concept. All the described components can be replaced by technically equivalent elements. Moreover the refrigerant and the liquid in which it is absorbed can be chosen according to requested technical requirements. In concluding the description, it should be noted that in the absorption machines described herein, the "main" absorber is represented by the heat exchanger 13, in which normally the absorption heat (exothermic process) is transferred to the outside of the cycle or system (typically via air or via water).

However the absorption process also takes place in "internal" absorbers, in which the absorption heat is recovered within the cycle. In the described embodiment, the absorber 10 is precisely of this type, which is commonly known as recuperative or regenerative, e.g. SCA, GAX. Specifically, it is cooled by the rich solution.

The invention claimed is:
1. An absorption heat pump comprising:
a generator or desorber for generating, from a first fluid, vapour for feeding via a first line to a first condenser in heat exchange contact with heat transmission fluid for cooling the vapour, said first condenser having an inlet for the vapour and an outlet for the cooled vapour,
downstream of the first condenser a second line entering an evaporator, the second line comprising at least a first throttle valve,
an evaporator outlet connected by a third line to an absorber inlet for passing vapour from said first fluid into an absorber,
the absorber comprising an enriched solution outlet for discharging an enriched solution of said first fluid absorbed in a second fluid,
a heat exchanger having an enriched solution inlet and an enriched solution outlet,
the absorber enriched solution outlet connected to the enriched solution inlet of the heat exchanger, the heat exchanger in heat transmission contact with heat transmission fluid,
the enriched solution outlet of the heat exchanger connected to a suction side of a pump,
a circuit in heat transmission contact with the absorber, the circuit having a circuit inlet and a circuit outlet,
the delivery side of the pump is connected by a fourth line to the circuit inlet,
a fifth line connected to the circuit outlet to connect said circuit to a rich solution inlet of the generator,
a bypass line having a bypass line inlet and a bypass line outlet, the bypass line inlet connected to the fourth line upstream of the circuit inlet, the bypass line outlet connected to the fifth line downstream of the circuit outlet,
the generator having a poor solution outlet connected by a sixth line provided with a throttle valve to a poor solution inlet of the absorber,
the fourth line connected to the bypass line positioned for having rich solution from the fourth line at most partially bypass the circuit,
a withdrawal line for introducing liquid refrigerant from the second line into the rich solution at an introduction point downstream of the pump into the bypass line, or a portion of the fourth line upstream of the connection to the bypass line inlet, and the bypass line comprises a valve for closing the bypass line.

2. A heat pump as claimed in the claim 1, wherein said introduction point is in the bypass line, upstream or downstream of the valve, said valve, when closed, for excluding the withdrawal line from the circuit.

3. A heat pump as claimed in claim 1, wherein said withdrawal line opens into the fourth line upstream of the bypass line, said withdrawal line comprising shutoff means able to exclude the withdrawal line from the circuit and arranged to enter into operation simultaneously with the valve.

4. A heat pump as claimed in claim 1, wherein said withdrawal line opens into the fifth line downstream of the bypass line, said withdrawal line comprising shutoff means able to exclude the withdrawal line from the circuit and arranged to enter into operation simultaneously with the valve.

5. A heat pump as claimed in claim 4, wherein the withdrawal line for withdrawing the liquid refrigerant is connected to the second line at a withdrawal point positioned directly down stream of the condenser.

6. A heat pump as claimed in claim 1, wherein the introduction point is in the form of a venturi or a liquid/liquid injector.

7. A heat pump as claimed in claim 6, wherein a non-return valve is provided in the withdrawal line for flowing refrigerant to the venturi or injector, between the withdrawal point and the introduction point.

8. A heat pump as claimed in claim 1, wherein the sixth line is in heat exchange contact with a central portion of the generator.

9. A heat pump as claimed in claim 1, wherein the fluids of the fifth line and of sixth line are brought into heat transmission contact via a heat exchanger regenerator, the bypass line opening downstream of said heat exchanger regenerator into the rich solution inlet.

10. A pump as claimed in claim 9, wherein a further throttle valve is provided in the sixth line downstream of the heat exchanger regenerator.

11. A method for improving the efficiency of absorption heat pumps under overfeed conditions of the generator, comprising
    generating, in a generator or desorber, from a first fluid, vapour, and feeding the vapour via a first line to a first condenser in heat exchange contact with heat transmission fluid for cooling the vapour, said first condenser having an inlet receiving the vapour and an outlet discharging the cooled vapour,
    downstream of the first condenser a second line feeding an evaporator, the second line comprising at least a first throttle valve,
    an evaporator outlet connected by a third line to an absorber inlet and passing vapour from said first fluid into an absorber through the absorber inlet,
    discharging through an absorber enriched solution outlet an enriched solution of said first fluid absorbed in a second fluid,
    passing enriched solution from the absorber enriched solution outlet through a heat exchanger having an enriched solution inlet and an enriched solution outlet,
    the absorber enriched solution outlet connected to the enriched solution inlet of the heat exchanger, the heat exchanger in heat transmission contact with heat transmission fluid,
    passing enriched solution from the enriched solution outlet of the heat exchanger connected to a suction side of the pump,
    a circuit in heat transmission contact with the absorber, the circuit having a circuit inlet and a circuit outlet,
    passing at least a first portion of said enriched solution from the delivery side of the pump through a fourth line to the circuit inlet,
    passing at least said first portion of said enriched solution from the circuit inlet, through the circuit, to a circuit outlet, into a fifth line connected to the circuit outlet to connect said circuit to a rich solution inlet of the generator,
    passing enriched solution through said fifth line from the circuit outlet into the rich solution inlet of the generator,
    through a bypass line, having a bypass line inlet and a bypass line outlet, the bypass line inlet connected to the fourth line upstream of the circuit inlet, the bypass line outlet connected to the fifth line downstream of the circuit outlet, excludably bypassing the absorber to direct a second portion of the rich solution discharged by the pump directly into the generator, and mix at least part of the rich solution before its entry into the generator with a part of a liquid refrigerant bled-off downstream of a condenser and passed through the withdrawal line, without precluding the operation of a cycle as an absorption heat pump,
    wherein the bypassing is excludable on the basis of the heat pump working conditions by valve means,
    passing poor solution from a generator poor solution outlet through a sixth line provided with a throttle valve to a poor solution inlet of the absorber,
    introducing liquid refrigerant from the second line through a withdrawal line into the rich solution at an introduction point downstream of the pump into the bypass line, or a portion of the fourth line upstream of the connection to the bypass line inlet, and
    excluding said withdrawal line from the circuit on command.

12. A method as claimed in claim 11, wherein this mixing takes place by a venture and/or a liquid/liquid injector.

13. An absorption heat pump comprising:
    an absorber having
        an absorber poor solution inlet,
        an absorber rich solution outlet,
        a heat transmission circuit inlet, and
        a heat transmission circuit outlet,
        an absorber vapour inlet,
    a generator having
        a generator vapour outlet,
        a generator rich solution inlet, and
        a generator poor solution outlet;
    the heat transmission circuit inlet connected to the absorber rich solution outlet via a heat transmission circuit inlet line,
    the heat transmission circuit outlet connected to the generator rich solution inlet via a heat transmission circuit outlet line,
    a bypass line connecting the heat transmission circuit inlet line and the heat transmission circuit outlet line,
    a condenser having
        a condenser inlet, connected to the generator vapour outlet, and
        a condenser outlet, connected both to the absorber poor solution inlet and to the bypass line;
    an evaporator having
        an evaporator inlet, and
        an evaporator vapour outlet,
    the evaporator vapour outlet connected by an evaporator vapour outlet line to the absorber vapour inlet, wherein no shutoff valve is present on the heat transmission circuit inlet line downstream of the bypass line, such that the heat transmission circuit inlet line is a permanently open conduit between the bypass line and the heat transmission circuit inlet of the absorber.

14. A heat pump as claimed in claim 13, wherein the outlet of the condenser is connected to the bypass line at an introduction point via a withdrawal line and wherein the withdrawal line comprises a valve.

15. A heat pump as claimed in claim 14, wherein the introduction point is in the form of a venturi.

16. A heat pump as claimed in claim 14, wherein the introduction point is in the form of a liquid/liquid injector.

* * * * *